United States Patent [19]
Yamamori

[11] 3,944,016
[45] Mar. 16, 1976

[54] LOCKING DEVICE FOR SELECTOR LEVER OF AUTOMATIC TRANSMISSION TO PREVENT CAR DRIVING WITHOUT WEARING SAFETY BELT

[75] Inventor: Takahiro Yamamori, Tokyo, Japan

[73] Assignee: Nissan Motor Company Limited, Yokohama, Japan

[22] Filed: Sept. 13, 1974

[21] Appl. No.: 505,543

[30] Foreign Application Priority Data
Sept. 29, 1973  Japan.............................. 48-108918

[52] U.S. Cl............. 180/82 A; 180/82 C; 180/103 R
[51] Int. Cl.²......................................... B60R 21/10
[58] Field of Search........ 180/82 A, 82 C, 101, 102, 180/103; 340/52 E, 52 F, 278; 307/105 B; 200/61.58 B

[56] References Cited
UNITED STATES PATENTS

| | | | |
|---|---|---|---|
| 1,675,465 | 7/1928 | Roehrich | 340/52 F |
| 1,805,088 | 5/1931 | Hardesty | 180/82 A |
| 3,438,455 | 4/1969 | Redmond | 180/82 C |
| 3,729,059 | 4/1973 | Redmond | 180/82 C |
| 3,859,625 | 1/1975 | Eggert | 180/82 C X |

FOREIGN PATENTS OR APPLICATIONS 944,045  12/1963  United Kingdom............... 340/52 E

*Primary Examiner*—M. H. Wood, Jr.
*Assistant Examiner*—Terrance L. Siemens

[57] ABSTRACT

A solenoid plunger and a retaining hole lock a selector lever inoperative when the transmission is in the neutral or parking position and a safety belt of a driver's seat is not worn, without hindering the car engine from being started. A switch unrelated to engine ignition and responsive to the wearing of the safety belt governs a current flow through the solenoid, so that the selector lever becomes operative when the safety belt is worn.

3 Claims, 9 Drawing Figures

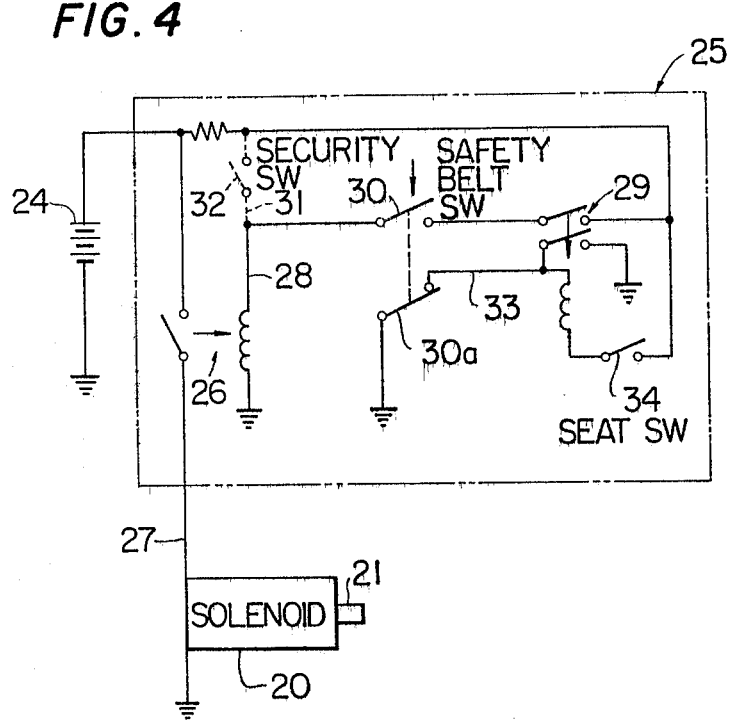
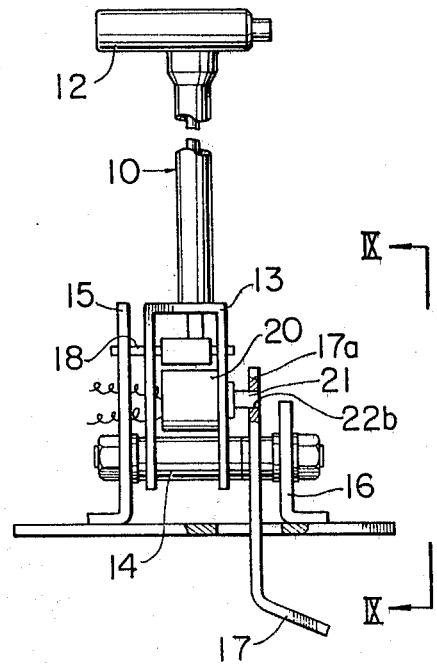
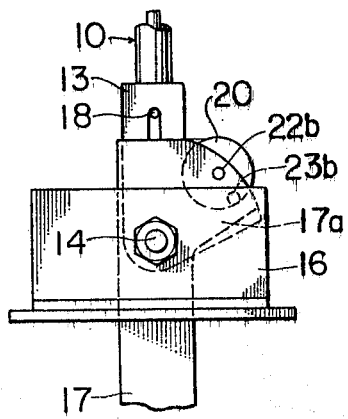

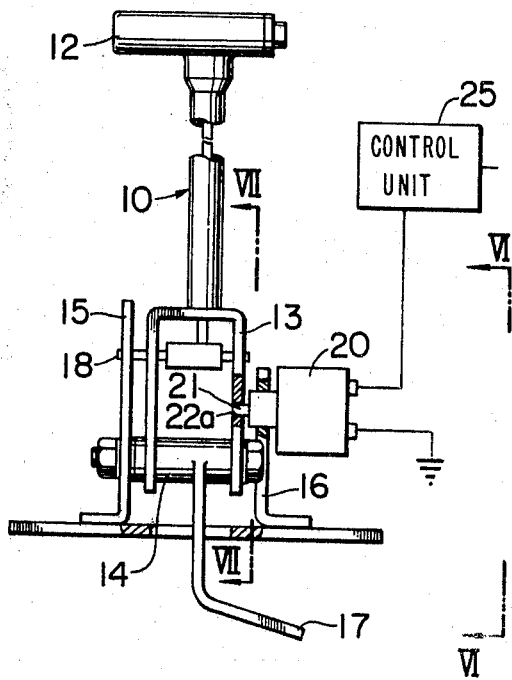
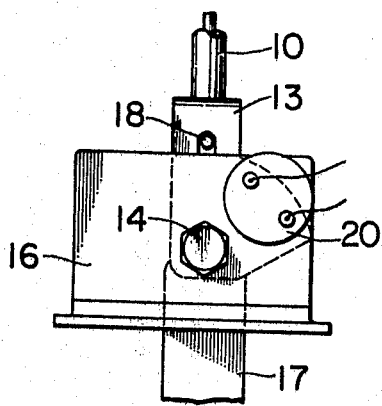
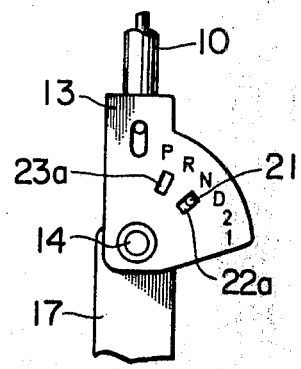
FIG. 5
FIG. 6
FIG. 7

LOCKING DEVICE FOR SELECTOR LEVER OF AUTOMATIC TRANSMISSION TO PREVENT CAR DRIVING WITHOUT WEARING SAFETY BELT

The present invention relates to a device for holding a shift lever of an automobile automatic transmission inoperative until a driver completes obligatory safety procedures before driving the automobile.

Automobile drivers in many countries have been obliged to wear safety belts to prevent themselves from injuries by the so-called "second collision" in collision accidents. It is, however, a regrettable fact that many drivers neglect the obligaion because of troublesome steps in wearing seat belts and discomfort caused by fastened belts. Consequently, a large portion of seat belts currently installed on almost every automobile have gone practically worthless.

In view of such a fact, there have been proposed some devices which give warning to an automobile driver and at the same time make it impossible to start the car engine if he intends to start the engine without wearing seat belts installed on the driver's seat. Such devices, however, have a disadvantage that a driver is forced to wear a seat belt whenever he intends to start the engine even if he has no intention of driving the car. For example, provision of such a device makes engine warming-up and/or engine inspection quite inconvenient.

Accordingly, it is a major object of the present invention to provide a device which prevents a driver driving an automobile having an automatic transmission but allows him to start the car engine when he does not wear a safety belt.

It is another object of the invention to provide such a device having simple construction.

It is still another object of the invention to provide such a device which can be associated with any other procedure for safety to be carried out before starting the car.

A device according to the invention is applicable to an automobile having an automatic transmission provided with a linking lever for range selection thereof and a manual selector lever for moving the former lever.

In brief, the device comprises:

a plunger and receptacle arranged to prevent the selector lever moving the linking lever from a position corresponding to the neutral or parking position of the transmission; and a control means to cause the plunger to move in such a manner that the selector lever is allowed to move the linking lever to any position when a predetermined procedure for safety is carried out.

Wearing of a safety belt of a driver's seat is a typical example of the predetermined procedure, and the plunger is preferably a solenoid plunger.

The solenoid plunger is preferably attached to either the selector lever or a fixed member for supporting the lever, and the receptacle is formed in the corresponding fixed member or selector lever so that the lever may be locked with the fixed member when the transmission is in the neutral or parking position and the safety belt is unused.

The control means preferably comprises a relay for governing the solenoid and at least two switches which close when the driver's seat is occupied and the safety belt is worn, respectively.

Other features and advantages of the invention will become apparent from the following detailed description of preferred embodiments thereof with reference to the accompanying drawings, in which:

FIG. 1 is a front elevation view of a shift lever assembly of an automobile automatic transmission provided with a device embodying one form of the present invention;

FIGS. 2 and 3 are partial side views of the assembly of FIG. 1 taken along lines 2—2 and 3—3 of FIG. 1, respectively;

FIG. 4 is a circuit diagram of a control unit for the device of FIG. 1;

FIG. 5 is a front elevation view of an assembly similar to FIG. 1 showing another embodiment of the invention;

Figure 1:
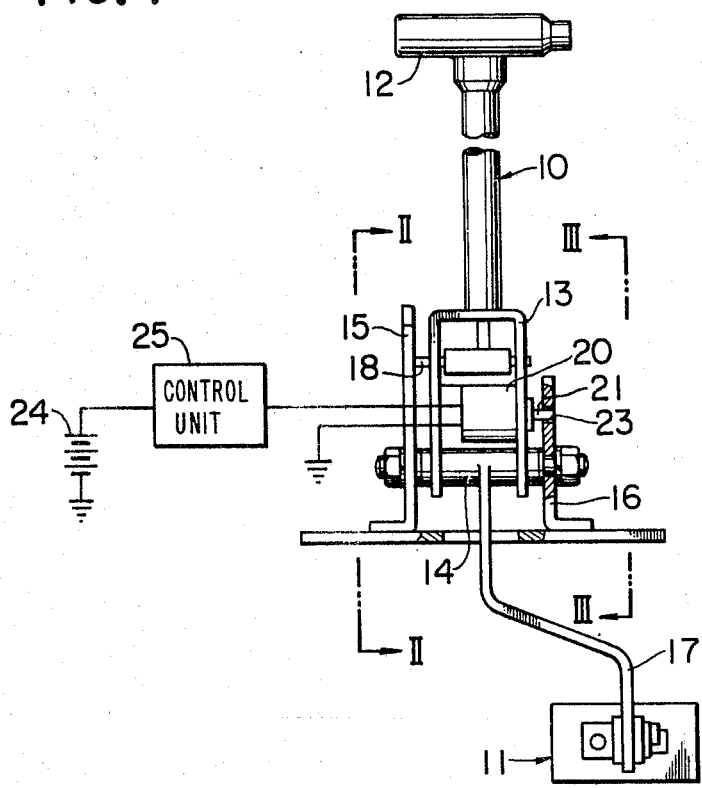

FIGS. 6 and 7 are partial side views taken along line 6—6 and 7—7 of FIG. 5, respectively;

FIG. 8 is a front elevation view of an assembly slightly modified from that of FIG. 1 showing a still another embodiment of the invention; and FIG. 9 is a partial side view taken along the line 9—9 of FIG. 8.

The present invention contemplates that automatic transmissions are prevailing in current automobiles and that an automatic transmission usually allows the automobile engine to be started only when the former is set in the neutral or parking position.

Figure 2:
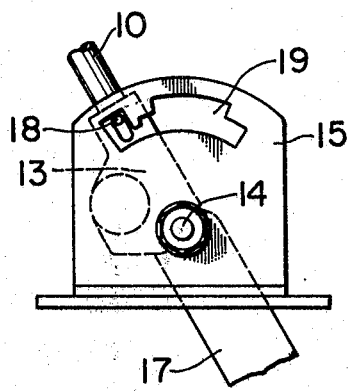

Referring to FIG. 1, a typical selector lever 10 for selecting a range of an automatic transmission 11 has a hand grip 12 at an end portion thereof, and the other end potion 13 is forked and fixed to an axle 14 which is rotatably supported by two positioning plates 15 and 16. A linking lever 17 extends from the transmission 11 and is fixed to the axle 14. The selector lever 10 has a pin 18 extending therefrom parallel to the axle 14. The pin 18 is inserted into a shaped slot 19 of FIG. 2 formed in the first positioning plate 15 to guide the selector lever 10 to and retain it in a selected position in a well known manner.

Figure 3:
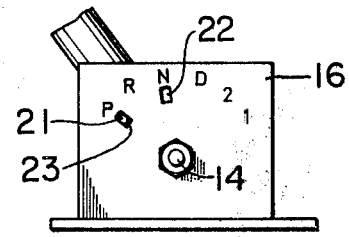

According to a first preferred embodiment of the invention, a solenoid 20 having a plunger 21 is attached to the forked portion 13 of the selector lever 10, and two receptacles or holes 22 and 23 are formed through the second positioning plate 16 as shown in FIG. 3 in such an arangement that the plunger 21 may mate with the first hole 22 when the lever 10 is in the neutral position and with the second hole 23 in the parking position. The solenoid 20 is connected with a DC power source 24 on the vehicle through a control unit 25, the circuit diagram of which is presented in FIG. 4. A first normally open relay 26 breaks a first circuit 27 for the solenoid 20, and a second circuit 28 for actuating the first relay 26 has in series a normally open second relay 29 and a normally open first switch 30 which is responsive to wearing or fastening of a seat belt of a driver's seat. An auxiliary circuit 31 having a normally open auxiliary switch 32 is preferably provided to the second circuit 28 by-passing the first switch 30. The auxiliary switch 32 is automatically closed when the automobile is running. A third circuit 33 for operating the second relay 29 has a normally open second switch 34, which is responsive to occupation of the driver's seat, and preferably a third switch 30a which is normally closed and opens when the first switch 30 closes. When the third switch 30a is employed, the second relay 29 should be of a stick or holding type as shown in FIG. 4. Thus, all the three circuits 27, 28 and 33 are kept open and the plunger 21 is protruding from the solenoid 20 and received in the hole 22 or 23 when the automobile is unoccupied and the selector lever 10 is positioned in neutral or parking.

When a person sits in the driver's seat, the second switch 34 is closed and the second relay 29 is actuated, but the second circuit 28 still remains open. In this state, the person can start the engine, but cannot shift the selector lever 10 from the neutral or parking position since the solenoid 20 is not energized and the plunger 21 is retained in the hole 22 or 23 of the positioning plate 16. If the person wants to move the selector lever 10 to start the car, the person has to wear the seat belt properly so that the first switch 30 may also be closed. The second circuit 28 is closed only when both the second relay 29 and the first switch 30 are on. The establishment of the second circuit 28 causes the first relay 26 to close the first circuit 27, and the solenoid 20 retracts the plunger 21 from the hole 22 or 23. Consequently, the person can thereafer shift the selector lever 10 and naturally the linking lever 17 to any position so long as the seat belt is properly worn. The provision of the third switch 30a allows the shifting only when the seat belt is fastened subsequently to occupation of the seat.

If the person should take off the seat belt or a certain failure should occur in the control unit 25 during driving, the first switch 30 is again turned off to cause the solenoid circuit 27 to break and the plunger 21 to thrust against the positioning plate 16. Such an action of the plunger 21 during the car running will possibly disturb the shifting of the selector lever 10 and hence should be avoided. It is preferable to provide the switch 32, which is associated with a speedometer or a tachometer of the car and keeps the by-pass circuit 31, i.e., the security switch 32 closed when the velocity of the car movement exceeds a predetermined level, so that any operation of the first switch 30 may not influence the first relay 26.

The location of the solenoid 20 with the plunger 21 and the holes 22 and 23 for the retention of the plunger 21 may be altered from those in the above embodiment. In a second preferred embodiment of the invention shown in FIGS. 5-7, the solenoid 20 having the plunger 21 is attached to the second positioning plate 16, and two holes 22a and 23a of the same function as the holes 22 and 23 of FIG. 3 are formed through a side of the forked portion 13 of the selector lever 10. It will be apparent that the arrangement of FIG. 5 is completely identical with that of FIG. 1 in the function thereof.

FIGS. 8 and 9 show a third embodiment of the invention the function of which is slightly different from those of the above embodiments. In this device, the linking lever 17 extending from the transmission 11 is not fixed to but is loosely fitted on the axle 14 and extends therefrom so that an extending portion 17a thereof may stand between and parallel to the selector lever 10 and the second positioning plate 16 as seen from FIG. 8. The solenoid 20 is attached to the selector lever 10 in a similar way to the first embodiment of FIG. 1, and the extending portion 17a of the linking lever 17 is provided with two holes 22b and 23b to mate with the plunger 21 when the transmission 11 and the selector lever 10 are either in the neutral or parking position. The function mode of either the solenoid 20 or the first relay 26 of FIG. 4 is reverse to the previous description so that the plunger 21 may be retracted from the hole 22b or 23b when the second circuit 28 is open, that is, when the seat belt is not worn. Accordingly, any movement of the selector lever 10 in such a state cannot operate the linking lever 17. The plunger 21 ties the linking lever 17 with the selector lever 10 and enables the transmission 11 to be shifted into any range when the seat belt is worn and the second circuit 28 is closed. Alternatively, the solenoid 20 may be attached to the extending portion 17a, forming the holes 22b and 23b in the opposing wall of the forked portion 13 of the selector lever 10.

Although the function mode of the plunger 21 is altered in the last embodiment, the object of compelling a driver to wear a seat belt only when the driver intends to really drive the automobile is accomplished throughout the above three embodiments of the invention by causing he linking lever 17 to be inoperative until the driver wears the seat belt. It is to be noted that a device according to the invention, namely, a combination of the solenoid 20 having the plunger 12, the plunger-retaining holes 22 and 23 and the control unit 25 is quite simple in construction and in respective elements.

In every arrangement of the above description, the holes 22 and 23 may be replaced with a shaped slot (not shown). The second circuit 28 of FIG. 4 may include additional switches or relays (not shown) to keep the linking lever 17 inoperative until completion of required safety procedures other than wearing of the seat belt such as, for example, locking of the doors and making an air-bag system operative.

What is claimed is:

1. A device for preventing an automobile automatic transmission from being shifted from one of the neutral and parking positions until a predetermined procedure for safety is carried out, the transmission being provided with a linking lever for range selection thereof and a manual selector lever for moving the linking lever, the device comprising:

a solenoid plunger attached to said selector lever,
a receptacle formed in said linking lever, said linking lever being normally disengaged with said selector lever, and
a control means arranged to cause said plunger to be received in said receptacle when said predetermined procedure is carried out, and thereby connect said linking lever and selector lever together and in which said predetermined procedure is the wearing of a safety belt of a drivers seat.

2. A device as claimed in claim 1, in which said control means comprises:

a first electric circuit for operating said solenoid, having a first relay;
a second electric circuit for operating said first relay, having in series a normally open first switch and a normally open second relay, said first switch being closed by said wearing of said safety belt; and
a third electric circuit for operating said second relay having a normally open second switch closed by the occupation of said driver's seat;
said three circuits being connected to a DC power source on the automobile.

3. A device as claimed in claim 2, in which said control means further comprises a normally closed third switch in said third circuit in series with said second switch, said third switch opening when said first switch closes, and said second relay being of a selfholding type so that said second relay may be prevented from opening when said third switch opens after said second switch is closed.

* * * * *